United States Patent Office 3,115,480
Patented Dec. 24, 1963

3,115,480
INITIATOR FOR PREPARATION OF TRIOXANE POLYMERS AND COPOLYMERS
Thomas R. Steadman, Kensington, and Fred Jaffe, Silver Spring, Md., assignors to W. R. Grace & Co., New York, N.Y., a corporation of Connecticut
No Drawing. Filed Aug. 2, 1961, Ser. No. 128,689
4 Claims. (Cl. 260—67)

The present invention relates to the production of polyoxymethylene polymers and copolymers. More specifically, the present invention contemplates the use of a novel polymerization catalyst for the preparation of high molecular weight polyoxymethylene polymers and polyoxymethylene-cyclic ether copolymers.

It is generally known that oxymethylene yielding compounds such as formaldehyde and trioxane will polymerize in the presence of a suitable catalyst or initiator to yield high molecular weight polymers having desirable physical and chemical properties. It is also known that useful polyoxymethylene-cyclic ether copolymers may be obtained by copolymerizing certain amounts of a cyclic ether such as propylene oxide, epichlorohydrin, or dioxolane, with a suitable polyoxymethylene yielding monomer such as trioxane in the presence of a suitable catalyst.

The catalysts normally used to initiate polymerization in polyoxymethylene and polyoxymethylene-cyclic systems are cationic catalysts such as the inorganic fluorides and organic complexes thereof. While prior art catalysts when used under proper reaction conditions will generally produce satisfactory polymers, it is often found that many of the most effective catalysts, due to their normally gaseous physical state and/or chemical unstability, are relatively difficult to handle, particularly in a large scale operation where consistent yield and quality of polymer is necessary. Further difficulties are encountered in the utilization of many known polymerization initiators in that certain ones are apt to initiate a reaction too rapidly for precise control to be exercised thereover. Lack of precise control over the polymerization process frequently leads to production difficulties and non-uniform product.

It is therefore an object of the present invention to provide an improved method for preparing high molecular weight polyoxymethylene polymers and copolymers.

It is another object to provide a novel polymerization catalyst which may be effectively used to produce stable high molecular weight polyoxymethylene polymers and cyclic ether copolymers from a variety of oxymethylene precursors and cyclic ether compounds.

It is still another object to provide an oxymethylene polymerization initiator which is chemically stable and easy to handle under a variety of polymerization conditions.

It is yet another object of the present invention to provide a polymerization catalyst which initiates the polymerization of oxymethylene yielding compounds in an orderly and efficient manner.

These and still further objects of the present invention will become readily apparent to one skilled in the art from the following detailed description and specific examples.

Broadly, the present invention contemplates a method for polymerizing oxymethylene compounds with or without a copolymerizable epoxide compound in which triphenylmethyl fluoborate is used as a polymerizing catalyst.

More specifically, the invention involves a method for preparing high molecular weight polyoxymethylene polymers and cyclic ether polyoxymethylene copolymers which comprises reacting an oxymethylene precursor, preferably trioxane, with up to 10 percent by weight of an oxirane compound in the presence of from about $\frac{1}{3} \times 10^{-6}$ to $\frac{1}{3} \times 10^{-3}$ moles of triphenylmethyl fluoborate catalyst per mole of —$CH_2O$— units present in the oxymethylene precursor at a temperature of from about 20 to about 130° C. The term oxymethylene precursor, as used herein, is meant to include oxymethylene yielding compounds such as trioxane and formaldehyde.

Thus, when the preferred oxymethylene precursor, trioxane is used, the catalyst such as formaldehyde, and trioxane concentration may be $10^{-6}$ to $10^{-3}$ moles of triphenylmethyl fluoborate per mole of trioxane.

The concentration of the catalyst used in the process of the present invention should be carefully regulated in that the use of excessive amounts of catalyst may result in an unstable final product, possibly because the catalyst that initiates the polymerization also catalyzes degradation of the polymer. In general, while useful catalyst concentrations in the range of from about $10^{-6}$ to about $10^{-3}$ moles of catalyst per mole of —$CH_2O$— units present in the oxymethylene precursor are present during the reaction, the preferred range is in the order of from $10^{-5}$ to $10^{-4}$ moles of triphenylmethyl fluoborate per mole of —$CH_2O$— units. For the normal practice of the invention, using trioxane, catalyst concentration of 2 to $8 \times 10^{-5}$ moles of triphenylmethyl fluoborate per mole of trioxane is generally used.

It is generally convenient to carry out the polymerization reaction at a temperature between the melting point and boiling point of oxymethylene precursor at atmospheric pressure. For example, the polymerization of trioxane may be carried out at a temperature of 64° to 130° C. Furthermore, lower temperatures in the order of 20° C. may be used if an inert solvent is used. However, the reaction at lower temperatures is relatively slow. Using trioxane, best results are generally obtained at temperatures of from about 60 to 80° C. whereat components such as solvents and low boiling cyclic ether monomers are easily contained in the reaction mixture. In other words, a temperature range of 60 to 80° C., while yielding a satisfactory rate reaction, also provides a system which is relatively easy to handle.

In general, the pressure at which the reaction is carried out is not critical, and for reasons of economy and ease of operation it is generally preferred to carry out the polymerization reaction at nearly atmospheric pressure whenever possible. Obviously, if the reaction is carried out in the higher temperature ranges, that is from 80 to about 130° C., suitable reflux systems or pressures greater than atmospheric should be used in order to prevent loss of epoxide monomer and/or inert solvent.

The precise time required to carry out a polymerization using the novel polymerization catalyst disclosed herein, will be dependent on several variable factors such as the type and amount of cyclic ether being used, the temperature of the reaction mixture, the type of oxymethylene precursor used, and so forth. For example, it is found that the polymerization of trioxane alone normally requires a shorter period than when cyclic ethers are copolymerized therewith. As a general rule, the rate of reaction increases with catalyst concentration and decreases with cyclic ether concentration. Trioxane, for example, when being polymerized by itself generally requires from about 5 minutes to 3 hours. On the other hand, when from 2 to 10% epichlorohydrin is copolymerized with trioxane, reaction periods varying from about one hour to about 24 hours are required to substantially complete the reaction.

The cyclic ethers which may be used to copolymerize the oxymethylene yielding compounds have the general formulae:

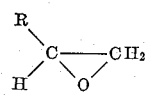

and

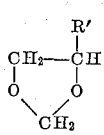

where R represents substituted or unsubstituted alkyl, aryl, aralkyl, alkaryl and cycloalkyl groups and R' represents hydrogen, methyl and chloromethyl groups. Suitable substituents on R include epoxy, halogen, cyano, nitro, carbalkoxy, and ether groups. Examples of such compounds include propylene oxide, ethylene oxide, epichlorohydrin, and dioxolane.

As mentioned previously, the oxymethylene yielding compound or precursor may be selected from the group which is represented by formaldehyde, and trioxane.

The reaction may be carried out in either a bulk polymerization system wherein the reactants are maintained essentially in the absence of solvent throughout the polymerization process, or the reaction may be carried out by a so-called particle-form process wherein a controlled amount of inert solvent is present and agitation is maintained during the polymerization reaction in order to promote the formation of a polymer having a particulate configuration.

Practically any inert solvent may be used in the present process. Suitable solvents include substituted and nonsubstituted aromatic hydrocarbons having 6 to 10 carbon atoms such as benzene, chlorobenzene, and nitrobenzene. Cycloaliphatic hydrocarbons are also suitable, particularly those having 5 to 10 carbon atoms such as cyclohexane, cyclopentane, cycloheptane, and cyclooctane. Suitable aliphatic hydrocarbons are those having 5 to 10 carbon atoms such as pentane, heptane, hexane, octane and so forth.

The present invention is further illustrated by the specific examples which follow.

In order to evaluate the various polymers prepared in accordance with the present invention, an arbitrary standard referred as to the thermal degradation constant at 222° C. has been adopted. The thermal degradation constant ($K_{222}$) is defined as the percent weight lost by a polyoxymethylene polymer per minute when the polymer is held at 222° C. In calculating the constant it is assumed that the polymer degrades in accordance with a first order reaction which may be expressed by the formula $$\frac{dw}{dt} = Kw$$

wherein $w$ represents the weight of the polymer, $t$ represents the time, and $K$ is the rate constant evaluated at 222° C. By determining weight loss directly or through gas evolution during degradation, it is seen that values for $K$ may be readily obtained.

To obtain polymers having a greater degree of stability, the polymer prepared in the following examples are stabilized through the addition of stabilizers such as phenyl-beta-naphthylamine and sodium silicate. Obviously, this stabilization procedure may be dispensed with if maximum stability is of no importance.

*Example I*

A particle-form polymerization reaction was carried out in a reaction kettle equipped with a dropping funnel, stirrer, and reflux condenser as follows. The apparatus was charged with 850 grams of pure trioxane (9.44 moles), 17 grams epichlorohydrin (0.183 mole), and 75 of dry cyclohexane. Stirring was commenced and 0.187 gram ($5.66 \times 10^{-4}$ mole) of triphenylmethyl fluoborate was added as a 1% solution in nitrobenzene to the reaction mixture which was maintained at 70° C. After two minutes, a solid phase appeared. Thereafter, 500 ml. of cyclohexane was added in 50 ml. increments and agitation was continued to keep the mixture from setting up. After 3 hours, the reaction was stopped and the polymer was filtered, washed and dried in vacuum at 50° C. for 18 hours. The yield was 538 grams (63% theory) of crude polymer. Pressing of the crude polymer at 350° F. and 30,000 p.s.i. gave a continuous film.

A 10 gram sample of the above prepared crude polymer was stabilized by first dissolving it in 100 ml. of hot dimethylformamide and then adding 0.1 gram of phenyl-beta-naphthylamine and 2 cc. of a 10% solution of sodium silicate. After ten minutes, the hot solution was poured into cold methanol whereupon the polymer precipitated and was subsequently filtered, washed and dried. The yield was 7.0 grams (70% theory) of stable polymer having a $K_{222}$ value of 0.08% by weight per minute.

*Example II*

A series of bulk polymerizations (in absence of solvent) utilizing different concentrations of triphenylmethyl fluoborate polymerization catalyst were carried out as follows. Individual charges of trioxane containing 2% by weight of epichlorohydrin were placed into crown capped tubes. The tubes were flushed with nitrogen and varying amounts of triphenylmethyl fluoborate were added thereto. Subsequently, the tubes were placed in a bath at 70° C. and held for a period of 45 minutes. The crude polymers were then washed and stabilized in a manner set forth in Example I. The results are tabulated in the table below.

| Sample | Moles Initiator/ Mole Trioxane | Yield of Crude Polymer (Percent) | Yield of Stabilized Polymer (Percent) | Film From Stabilized Polymer | $K_{222}$ (percent by wt./ sec.) |
|---|---|---|---|---|---|
| 1 | $2 \times 10^{-5}$ | 42 | 37 | Brittle | 0.06 |
| 2 | $4 \times 10^{-5}$ | 71 | 71 | Tough | 0.04 |
| 3 | $5 \times 10^{-5}$ | 85 | 77 | do | 0.11 |
| 4 | $8 \times 10^{-5}$ | 87 | 64 | do | 0.07 |
| 5 | $10 \times 10^{-5}$ | 93 | 56 | Brittle | 0.07 |

All the above samples yielded continuous films when pressed at 350° F. and 30,000 p.s.i.

*Example III*

The apparatus described in Example I was used. To a mixture of 364 g. (4.05 mole) of trioxane and 3.64 g. of propylene oxide at 70° C. was added 8.0 ml. of a 1% solution of triphenylmethyl fluoborate in nitrobenzene. The mixture turned yellow when the initiator was added. Polymer appeared 2½ minutes after the initiator was added. The color disappeared when polymer started to form. Then 12.5 ml. portions of cyclohexane were added as needed to maintain a fluid medium. A total of 150 ml. of cyclohexane was added over a 2½ hour period. The reaction was terminated by adding 500 ml. of acetone. The product was filtered, washed with hot acetone and dried in a vacuum overnight. The reaction provided 198 g. of white polymer (54% yield). A 10 g. sample was stabilized as in Example I to give 6.2 g. of polymer then pressed into a tough continuous film when pressed at 350° F. and 10,000 p.s.i. The stability was determined by the syringe stability method and the decomposition rate constant, $K_{222}$ was 0.07 wt. percent per minute.

The above examples indicate the triphenylmethyl fluoborate may be used to effectively polymerize trioxane and copolymers thereof. It is further illustrated that due to its inherent stability, triphenylmethyl fluoroborate may be conveniently utilized in the form of a dilute solution. The polymers obtained by the herein contemplated reaction method are shown to yield stable polymers for a variety of applications.

We claim:

1. A method for preparing high molecular weight polyoxymethylene polymers and copolymers which comprises reacting an oxymethylene group yielding compound selected from the group consisting of trioxane and formaldehyde and up to 10% by weight of a cyclic ether selected from the group consisting of ethylene oxide, epichlorohydrin, propylene oxide, and dioxolane in the presence of from about $\frac{1}{3}$ to $10^{-6}$ to $10^{-3}$ moles triphenylmethyl fluoborate per mole of said oxymethylene yielding compound at a temperature of from about 20° to about 130° C.

2. A method for preparing high molecular weight polyoxymethylene polymers and polyoxymethylene-epoxide copolymers which comprises reacting trioxane and up to 10% by weight of epichlorohydrin in the presence of $10^{-6}$ to $10^{-3}$ moles of triphenylmethyl fluoborate per mole of trioxane at a temperature of from about 20° to about 130° for a period of from about 5 minutes to about 24 hours.

3. The method of claim 2 wherein the temperature is in the range of from 60° to 100° C.

4. The method of claim 3 wherein the reaction is carried out in the presence of an inert solvent, said inert solvent selected from the group consisting of hydrocarbons, nitrohydrocarbons, and halohydrocarbons having 5–10 carbon atoms.

No references cited.